United States Patent
Lo (10) Patent No.: US 8,239,419 B2
(45) Date of Patent: Aug. 7, 2012

(54) GENERATING SERVICE COMPONENT DEFINITION LANGUAGE FROM METADATA

(75) Inventor: Albert Honghsi Lo, East Brunswick, NJ (US)

(73) Assignee: Oracle International Corporation, Redwood Shores, CA (US)

(*) Notice: Subject to any disclaimer, the term of this patent is extended or adjusted under 35 U.S.C. 154(b) by 459 days.

(21) Appl. No.: 12/535,300

(22) Filed: Aug. 4, 2009

(65) Prior Publication Data
US 2011/0035389 A1 Feb. 10, 2011

(51) Int. Cl.
*G06F 7/00* (2006.01)
*G06F 17/30* (2006.01)
(52) U.S. Cl. ......... 707/797; 707/802; 707/803; 707/804
(58) Field of Classification Search .................. 707/790, 707/792, 793, 797, 802, 803, 804, 805, 807
See application file for complete search history.

(56) References Cited

U.S. PATENT DOCUMENTS

| | | | |
|---|---|---|---|
| 7,072,958 B2* | 7/2006 | Parmar et al. | 709/223 |
| 7,197,125 B1* | 3/2007 | Prasad et al. | 379/201.02 |
| 7,421,699 B2* | 9/2008 | Brendle et al. | 719/310 |
| 7,844,612 B2* | 11/2010 | Colgrave et al. | 707/754 |
| 7,856,226 B2* | 12/2010 | Wong et al. | 455/414.1 |
| 7,890,568 B2* | 2/2011 | Belenki | 709/200 |
| 7,950,023 B2* | 5/2011 | Scougall et al. | 719/328 |
| 8,001,246 B2* | 8/2011 | Lu et al. | 709/226 |
| 8,069,435 B1* | 11/2011 | Lai | 717/106 |
| 2005/0262194 A1* | 11/2005 | Mamou et al. | 709/203 |
| 2007/0016897 A1* | 1/2007 | Todd | 717/143 |
| 2007/0233696 A1* | 10/2007 | Ishihara et al. | 707/10 |
| 2007/0255719 A1* | 11/2007 | Baikov et al. | 707/10 |
| 2008/0294754 A1* | 11/2008 | Lu et al. | 709/220 |

OTHER PUBLICATIONS

IBM.com; "IBM Websphere Developer Technical Journal: Building SOA Solutions With the Service Component Architecture—Part 1"; Oct. 26, 2005; http://www.ibm.com/developerworks/websphere/techjournal/0510_brent/0510_brent.html; pp. 1-38.
IBM.com; "Service Component Architecture"; Nov. 30, 2006; http://www.ibm.com/developerworks/library/specification/ws-sca/; pp. 1-3.
Wikepedia.org; "TUXEDO (Software)"; page last modified Jul. 14, 2009; http://en.wikipedia.org/w/index.php?title=Tuxedo_(software)&printable=yes; pp. 1-5.
Oracle Data Sheet; "ORACLE TUXEDO" Copyright © 2009; pp. 1-7.

* cited by examiner

*Primary Examiner* — Merilyn Nguyen
(74) *Attorney, Agent, or Firm* — Squire Sanders (US) LLP (57) ABSTRACT

An SCA generator is configured to use data in a Metadata repository to generate files that can be used by an SCA server. The SCA generator includes an instruction analyzing module configured to analyze input instructions and to determine the Metadata repository from the input instructions. The SCA generator also includes a matching module configured to match a service identifier received with the input instructions to service metadata stored in the Metadata repository and a retrieving module configured to retrieve service parameters for the matched service. The SCA generator further includes a tree generating module configured to generate a parser tree based on the retrieved service parameters and an output file generation module configured to recursively walk through the parser tree and to generate target output files. The target output files generated by the output generation module are configured such that the SCA server can access services that have associated service metadata stored in the Metadata repository.

11 Claims, 3 Drawing Sheets

GENERATING SERVICE COMPONENT DEFINITION LANGUAGE FROM METADATA

FIELD

One embodiment is directed generally to a computer system, and in particular to file generation in a computer system.

BACKGROUND

Enterprise application servers may implement a service-oriented architecture ("SOA") and are often utilized by businesses to deliver application services. SOA is a strategy that organizes the discrete functions contained in enterprise applications into interoperable, standards-based services that may be combined and reused to meet business needs. Such application servers may be distributed to handle a large number of transactions and may provide mission-critical systems, including core banking services, airline reservations, brokerage services, e-commerce operations, and telecom services. Tuxedo® Service Metadata, used by Oracle Tuxedo®, contains information pertaining to services available in a Tuxedo® Domain.

In the case of Service Component Architecture ("SCA"), a set of specifications is used that describe a model for building applications and systems using SOA. SCA extends and complements prior approaches to implementing services, builds on open standards such as web services and encourages an SOA organization of business application code based on components that implement business logic. SCA relies on a composite file defined in Service Component Definition Language ("SCDL") that can describe a service provided by such a component. Tuxedo® Service Metadata and SCA differ in both philosophy and programming model and data in a Tuxedo® Metadata Repository typically cannot be used by a SCA server to access services. To access a Tuxedo® service from a SCA client or to access a SCA component from a Tuxedo® server typically requires knowledge not only of Tuxedo®, but also of the SCA framework, with its tedious Extensible Markup Language ("XML")-based composite and component files.

SUMMARY

In an embodiment, an SCA generator is configured to use data in a Metadata repository to generate files that can be used by an SCA server. The SCA generator includes an instruction analyzing module configured to analyze input instructions and to determine the Metadata repository from the input instructions. The SCA generator also includes a matching module configured to match a service identifier received with the input instructions to service metadata stored in the Metadata repository and a retrieving module configured to retrieve service parameters for the matched service. The SCA generator further includes a tree generating module configured to generate a parser tree based on the retrieved service parameters and an output file generation module configured to recursively walk through the parser tree and to generate target output files. The target output files generated by the output generation module are configured so that the SCA server can access services that have associated service metadata stored in the Metadata repository.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which.

DETAILED DESCRIPTION

In some embodiments, an SCA generator is configured to use data in a Metadata repository to generate files that can be used by an SCA server. The SCA generator generates a parser tree based on service parameters and recursively walks through the parser tree and to generate target output files. The target output files generated by the output generation module are configured so that the SCA server can access services that have associated service metadata stored in the Metadata repository.

In some embodiments, Oracle Services Architecture Leveraging Tuxedo® ("SALT") provides a new programming model based on SCA for Tuxedo® for building applications and solutions. Oracle SALT® is a standards-based, bidirectional Web-services gateway for Oracle Tuxedo® supporting enterprise applications written in programming languages including C, C++ and COBOL, among others. Oracle SALT® allows applications to access existing Tuxedo® services as standard Web services as well as allowing Tuxedo® applications to call external Web services with a high-performance, easy-to-use, configuration-driven model. In this context, a service is a business function provided by a component.

In such embodiments, a tool is provided by Tuxedo® SALT for SCA that allows interfaces and SCDL-based component and composite files to be generated from data gathered through a Tuxedo® Service Metadata Repository. An SCA component is a configured instance of an implementation and includes the specification of the defined properties, provided services and required service references for the implementation. An SCA composite is an aggregation of components. Using this tool, a developer does not need to learn the SCA framework. The input for the tool may be Tuxedo® Service Metadata and the output may be various files. The process may be to transform the Tuxedo® Service Metadata into SCA SCDL files and schema files for XML. In some embodiments, the tool generates header files, composite files, component files, and in some cases, XML Schema Definition ("XSD") schema for complex data types to help the developer develop an SCA solution for Oracle SALT®. The tool is capable of performing server-side conversion of service definitions in the Tuxedo® Service Metadata Repository for a Tuxedo® server into SCDL and/or interface files for SCA. The tool is also capable of generating interface and SCDL files that can be used by a client. The generated SCDL composite and component files may also help architects and administrators to deploy a SCA component-based application within a Tuxedo® Application Domain.

A function of some embodiments of the present invention is to generate appropriate header files and SCA SCDL files in order to ease development tasks. The files are also used by the SCA runtime to locate Application-to-Transaction Monitor Interface ("ATMI") components. ATMI is an Application Programming Interface ("API") that supports the development of transactional applications in the Tuxedo® environment. Some embodiments of the tool take Tuxedo® Service Metadata regardless of whether it is stored in a Tuxedo® Metadata Repository Runtime Service, a Tuxedo® Service Metadata Repository file or in a Tuxedo® Service Metadata Repository input file.

In some embodiments, the files that are generated for each service may include a composite file (described with a ".composite" extension herein), a component file (described with a ".componentType" extension herein), an abstract base class header file (used as an interface), and a skeletal implementation class header file. Depending on the complexity of the input arguments, the output buffer type, the error buffer type, and extra XSD schema may also be generated for each service.

Optionally, in some embodiments, a user can specify whether he or she wants to generate a single composite and a single component file with multiple Tuxedo® services. A combined single abstract base class file and a skeletal implementation class header file can also be generated at the user's discretion. The user further has the ability in some embodiments to choose whether to generate server side or client side SCDL files. By default, the tool may be configured to generate server side SCDL files.

The Generated Composite File

The purpose of the generated composite file in some embodiments is for the SCA runtime to know where the service is located. To accomplish this in the client code, a composite context may be retrieved and used to call a function that locates a service, referred to as "locateService( )". The SCA runtime may then read the generated composite file. For the purposes of this example, a service called "TOUPPER" that converts lower case characters into upper case characters will be used. The composite file may be as follows:

```
<?xml version="1.0" encoding="UTF-8"?>
<composite xmlns="http://www.osoa.org/xmlns/sca/1.0"
  name="TOUPPERComposite">
   <service name="TOUPPER">
      <interface.cpp header="TOUPPER.h"/>
      <binding.atmi requires="legacy">
         <map target="TOUPPER">TOUPPER</map>
         <serviceType>RequestResponse</serviceType>
         <inputBufferType
         target="TOUPPER">STRING</inputBufferType>
         <outputBufferType
         target="TOUPPER">STRING</outputBufferType>
      </binding.atmi>
      <reference>TOUPPERComponent</reference>
   </service>
   <component name="TOUPPERComponent">
      <implementation.cpp library="TOUPPER"
      header="TOUPPERImpl.h"/>
   </component>
</composite>
```

The above composite TOUPPERComposite contains a component called TOUPPERComponent and a service called "TOUPPER". The TOUPPERComponent may be implanted in a shared object called TOUPPER.dll for Windows® and libTOUPPER.so for UNIX. The access methods are described in the header TOUPPERImpl.h.

It is also possible to generate a composite file suitable for client use, such as the following:

```
<?xml version="1.0" encoding="UTF-8"?>
<composite xmlns="http://www.osoa.org/xmlns/sca/1.0"
  name="TOUPPERComposite">
   <reference name="TOUPPER">
      <interface.cpp header="TOUPPER.h"/>
      <binding.atmi requires="legacy">
         <serviceType>RequestResponse</serviceType>
         <inputBufferType
         target="TOUPPER">STRING</inputBufferType>
         <outputBufferType
         target="TOUPPER">STRING</outputBufferType>
      </binding.atmi>
   </reference>
</composite>
```

The Generated ComponentType File

The generated component type file links the name of the implementation class with abstract behavior. The file is named after the implementation class and contains a reference to the abstract class. It may be named TOUPPERImpl.componentType, for example, and may be as follows:

```
<?xml version="1.0" encoding="UTF-8"?>
<componentType xmlns="http://www.osoa.org/xmlns/sca/1.0">
   <service name="TOUPPER">
      <interface.cpp header="TOUPPER.h"/>
   </service>
</componentType>
```

The Generated Abstract Class Header File

The abstract base class represents the Tuxedo® service that is to be exposed. This may be similar to defining a Java interface. The header file of this abstract class will be used by the client application to understand the available Tuxedo® service interface. The class may be the same as the file name without an extension. The abstract class header file may be as follows:

```
#ifndef TOUPPER_h
#define TOUPPER_h
#include <string>
class TOUPPER
{
public:
    virtual std:string TOUPPER(std::string) = 0;
}
#endif TOUPPER_h
```

While a C++ header is shown above, one of ordinary skill in the art will readily appreciate that the tool may be configured for Java, COBOL, or any other desired programming language.

The Generated Implementation Class Header File

The generated implementation class header file for TOUPPER may be named TOUPPERImpl.h. However, as with all of the files discussed above, the naming convention that is used is by design choice. The implementation class header file may be as follows:

```
#ifndef TOUPPERImpl_h
#define TOUPPERImpl_h
#include "TOUPPER.h"
#include <string>
class TOUPPERImpl:public TOUPPER
{
public:
        TOUPPERImpl( );
        virtual ~TOUPPERImpl( );
        virtual std:string TOUPPER(std::string);
}
#endif TOUPPERImpl_h
```

By default, in some embodiments, each Tuxedo® service definition in the Tuxedo® Service Metadata Repository may generate one composite file, one component file, one abstract class header file and one implementation header file, and in some instances, may further generate an XSD schema for complex data types. However, with a large Tuxedo® Service Metadata Repository, this may not be ideal since a large number of files would be generated. In such a case, the user may specify a single composite file, component file, abstract class header file, and implementation header file separately. The composite file and component file would each contain multiple services.

As noted above, in the case of a complex data type, it may be desirable to generate an XSD schema. For instance, in the following example, ACCOUNTSVC has multiple parameters, ACCOUNT_ID, ACCOUNT_NAME and ACCOUNT_BALANCE. The XSD schema for this service may appear as follows:

```
<xsd:schema
xmsns:xsd="http://www.w3.org/2001/XMLSchema"
xmlns:sdo="commonj.sdo"
xmlns:sdoxml="commonj.sdo/xml" >
    <xsd:element name="in_ACCOUNTSVC"
    type="in_ACCOUNTSVCType"/>
    <xsd:element name="out_ACCOUNTSVC"
    type="out_ACCOUNTSVCType"/>
    <xsd:complexType name="in_ACCOUNTSVCType">
       <xsd:sequence>
          <xsd:element name="ACCOUNT_ID" type="xsd:long"\>
          <xsd:element name="ACCOUNT_NAME" type="xsd:string"\>
       </xsd:sequence>
    </xsd:complexType>
    <xsd:complexType name="out_ACCOUNTSVCType">
       <xsd:sequence>
          <xsd:element name="ACCOUNT_BALANCE"
          type="xsd:float"\>
          <xsd:element name="ACCOUNT_NAME" type="xsd:string"\>
       </xsd:sequence>
    </xsd:complexType>
</xsd:schema>
```

A typical flow of development in some embodiments utilizing Tuxedo® may be as follows:
(1) Define SCDL;
(2) Write implementation and abstract header files;
(3) Write XSD schema(s) for complex data types;
(4) Write program(s) using languages such as C++ and Java;
(5) Compile and link the program(s);
(6) Configure Tuxedo®; and
(7) Deploy the program(s) and or run client program(s).

In some embodiments, the tool solves (1), (2), (3) and part of (7) for SCA developers. Developers still write business logic in a programming language such as C++ or Java. Compiling and linking in (4) may be performed by a set of sister tools and (5) may also be performed by a companion to the tool using the output files as input. Using some embodiments of the tool, a developer does not need to know how to get deployed by Tuxedo®, how to communicate with Tuxedo® services (and vice versa), and how to create/prepare Tuxedo® C-style data to be consumed by Tuxedo® services.

Figure 1:
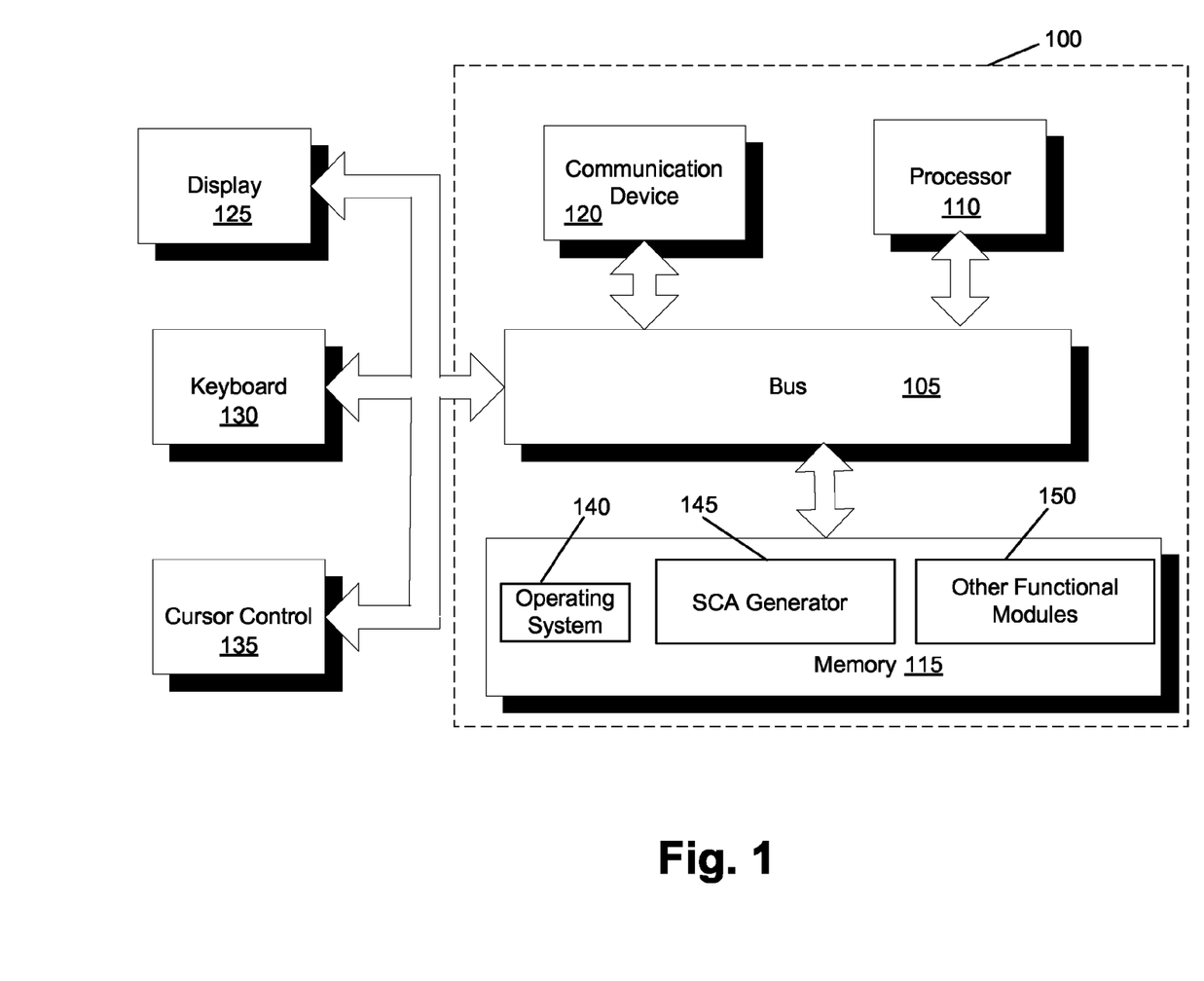
FIG. 1 is a block diagram illustrating a server having an SCA generator that can implement an embodiment of the present invention.

FIG. 1 is a block diagram of a server 100 that can implement an embodiment of the present invention. Server 100 includes a bus 105 or other communication mechanism for communicating information, and a processor 110 coupled to bus 105 for processing information. Processor 110 may be any type of general or specific purpose processor, including a central processing unit ("CPU") or application specific integrated circuit ("ASIC"). Server 100 further includes a memory 115 for storing information and instructions to be executed by processor 110. Memory 115 can be comprised of any combination of random access memory ("RAM"), read only memory ("ROM"), flash memory, cache, static storage such as a magnetic or optical disk, or any other types of computer readable media or combination thereof. Additionally, server 100 includes a communication device 120, such as a network interface card, to provide access to a network. Therefore, a user may interface with server 100 directly, or remotely through a network or any other method.

Computer readable media may be any available media that can be accessed by processor 110 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 110 is further coupled via bus 105 to a display 125, such as a Liquid Crystal Display ("LCD"), for displaying information to a user, such as server status information. A keyboard 130 and a cursor control device 135, such as a computer mouse, is further coupled to bus 105 to enable a user to interface with system 100.

In one embodiment, memory 115 stores software modules that provide functionality when executed by processor 110. The modules include an operating system 140 that provides operating system functionality for server 100. The modules further include an SCA generator 145 that is configured to identify and provide selected secure resources. Server 100 can be part of a larger system such as a cluster computing system, a distributed computing system, a cloud computing system, a "server farm" or any other system having multiple servers and/or computing devices. Server 100 will typically include one or more additional functional modules 150 to include additional functionality. In some embodiments, SCA generator 145 may be part of operating system 140 or part of one or more other functional modules included in other functional modules 150.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
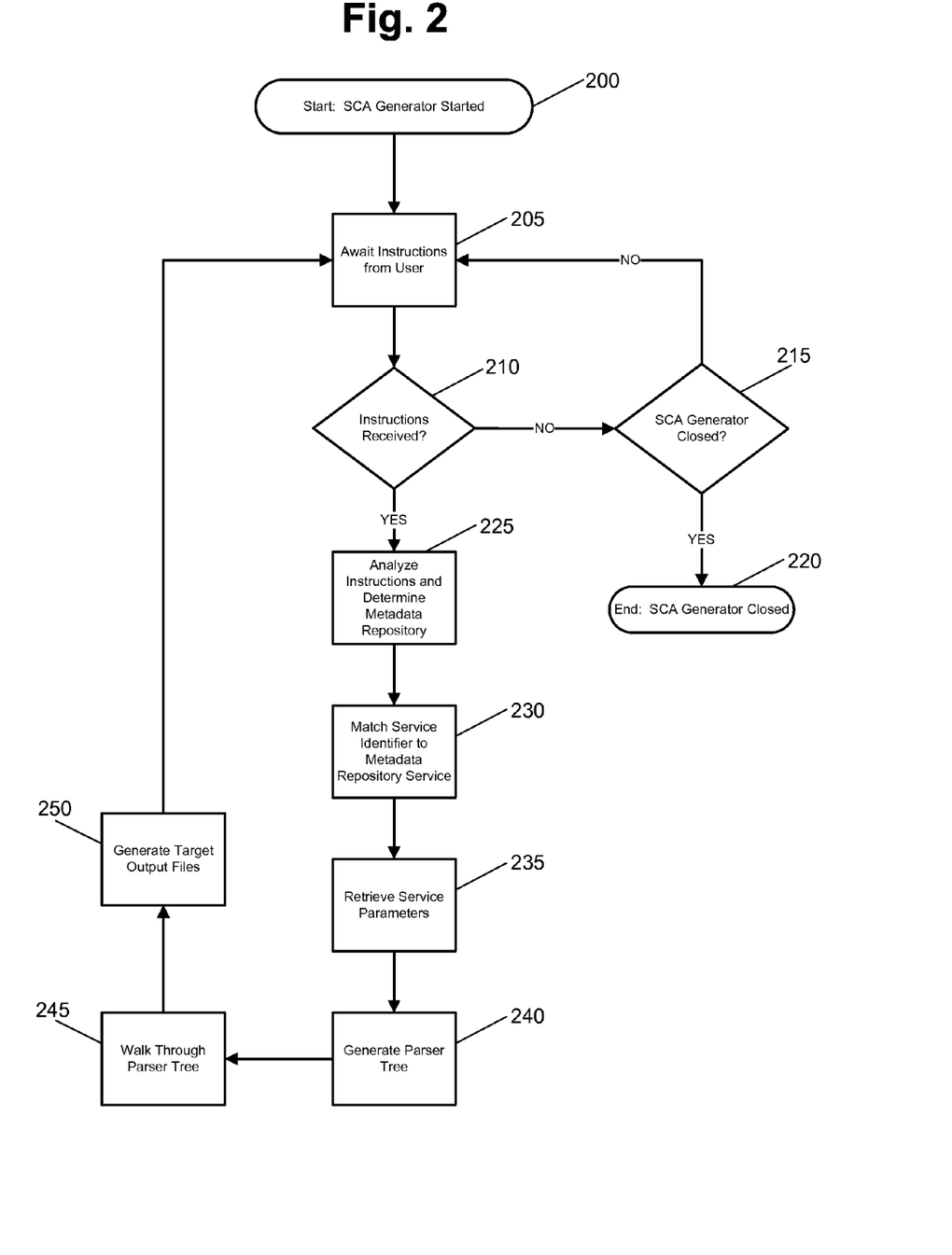
FIG. 2 is a flow diagram illustrating a process flow for using data in a Metadata repository to generate files that can be used by an SCA server according to an embodiment of the present invention.

FIG. 2 is a flow diagram illustrating a process flow for converting data in a Metadata repository into a form that can be used by an SCA server according to an embodiment of the present invention. In some embodiments, the functionality of FIG. 2 is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 2 may be performed, for example, by server 100 of FIG. 1 via SCA generator 145. In FIG. 2, the process flow begins with SCA generator 145 being started at 200. The computer on which SCA generator 145 is running, such as a server, then awaits instructions from a user at 205. Such instructions may be command line instructions for generating SCDL files from a metadata repository and may include information such as a target root directory, the service name, the Tuxedo® client name, the Tuxedo® user name, the Java package name, the output SCDL file name, the output interface file name, the maximum number of interface arguments and various parameters regarding the types of files to be generated, for instance.

SCA generator 145 then periodically checks for instructions at 210. If instructions have not been received, and SCA generator 145 has not been closed at 215, SCA generator 145 continues to await instructions that are input by a user at 205. If the application has ended, the process ends at 220. If instructions have been received (the "YES" arrow of 210), SCA generator 145 then proceeds to analyze the instructions at 225 to determine the Metadata repository that is to be used. Per the above, in Tuxedo®, the Metadata repository to be used may be a Tuxedo® Metadata Repository Runtime Service, a Tuxedo® Service Metadata Repository file or in a Tuxedo® Service Metadata Repository input file.

Once the Metadata repository is determined, SCA generator 145 matches a service identifier from the input instructions to service metadata stored in the appropriate metadata repository at 230 and retrieves parameters for the service at 235. SCA generator 145 then builds a parser tree for the service at 240. In some embodiments, the parser tree may be generated starting with a root directory, followed by a service group, the service and the service parameters.

Figure 3:
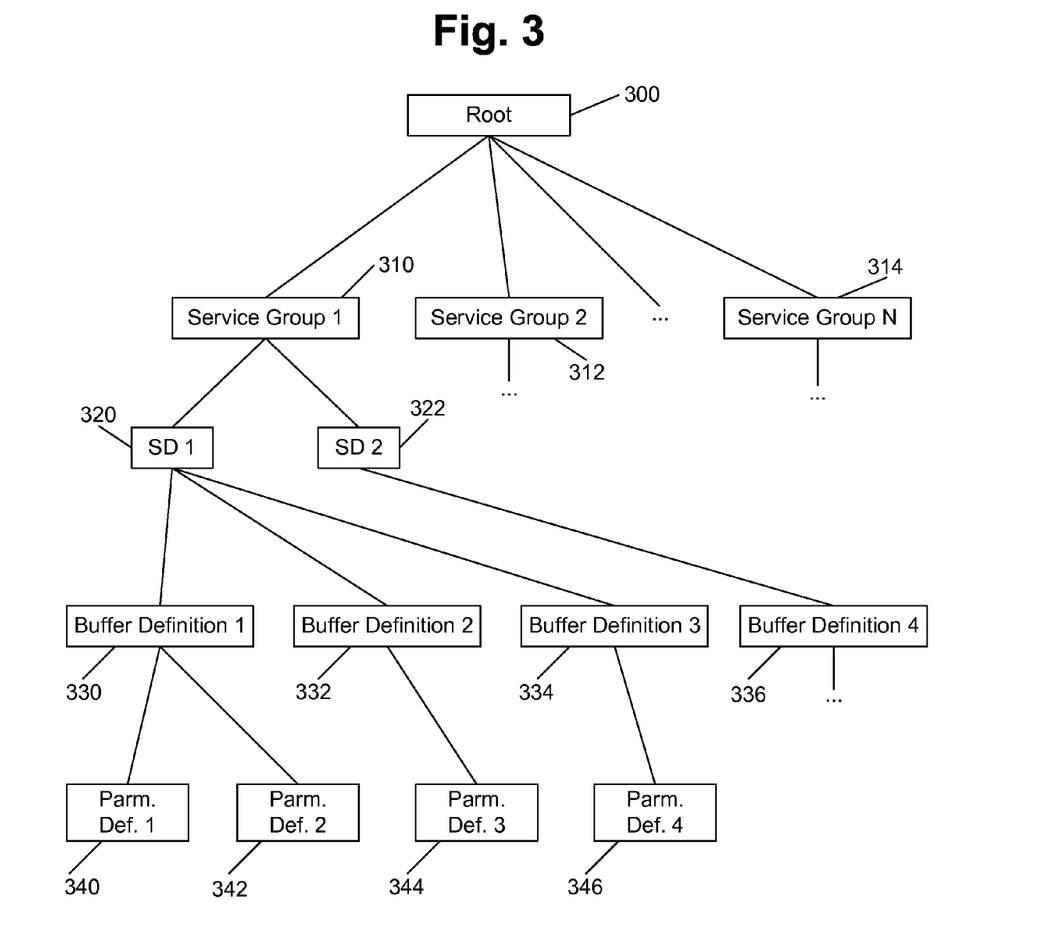
FIG. 3 is a tree diagram illustrating an example of a parser tree according to an embodiment of the present invention.

An example of a parser tree is illustrated in FIG. 3. The tree contains a root node 300 and there is only a single root node in the parser tree. From the root, service group 1 310, service group 2 312 and service group N 314 are child nodes of root node 300. Any number of service groups may be included in the tree. Two service definitions, SD 1 320 and SD 2 322, are children of service group 1 310. While further details of service group 2 312 and service group N 314 are not shown, there is at least one service definition per service group. Buffer definition 1 330, buffer definition 2 332 and buffer definition 3 334 are children of SD 1 320 and buffer definition 4 336 is a child of SD 2 322. In some embodiments, there is at most three buffer definitions per service definition. Parameter definitions Parm. Def. 1 340 and Parm. Def. 2 342 are children of buffer definition 1 330. Parm. Def. 3 344 is a child of buffer definition 332 and Parm. Def. 346 is a child of buffer definition 334. Each buffer definition has at least one parameter definition. While not shown, each parameter definition may have a further associated buffer definition and in some embodiments, there is at most one further buffer definition as a child of a parameter definition. Each further buffer definition has one or more parameter definitions as child nodes. The inclusion of additional buffer nodes and parameter nodes as children/grandchildren of a parameter may continue in this fashion as many times as is desired.

Once the parser tree is generated, SCA generator 145 then recursively walks through the parser tree at 245 and generates the target output files at 250. Per the above, the target output files may include a composite file, a component file, an abstract class header file, a implementation header file, and at least one XSD schema for complex data types. SCA generator 145 then once again awaits instructions from the user at 205.

As disclosed, an embodiment is an SCA generator that is configured to use data in a Metadata repository to generate files that can be used by an SCA server. The generated files are configured such that the SCA server can access services that have associated service metadata stored in the Metadata repository without having any information regarding the architecture of the Metadata repository. Using this tool, a developer does not need to learn the tedious SCA framework. The tool generates header files, composite files, component files, and in some cases, Extensible Markup Language ("XML") Schema Definition ("XSD") schema for complex data types to help a developer develop SCA applications interfacing with Tuxedo® more efficiently than was previously possible. The tool is capable of performing server-side conversion of service definitions in the Tuxedo® Service Metadata Repository into SCDL and/or interface files for SCA, as well as generating interface and SCDL files that can be used by a client.

While the term "server" has been used in the description of some embodiments of the present invention, the invention may be applied to many types of network computing devices. For purposes of this invention, the term "server" includes rack computing systems, cloud computing systems, distributed computing systems, personal computers, laptops, cell phones, personal digital assistants, tablet computing devices, mainframes, any networked devices that perform computing operations, and any of these physical servers. A server may also be an application server, such as Oracle Tuxedo®, and may be run as software on a single physical server or distributed across multiple physical servers.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A non-transitory computer readable medium having instructions stored thereon that, when executed by a processor, cause the processor to perform a process that uses data in a metadata repository to generate files that can be used by a Service Component Architecture (SCA) server, the process comprising:
   analyzing input instructions and determining the metadata repository from the input instructions, wherein the metadata repository comprises an architecture;
   matching a service identifier received with the input instructions to service metadata stored in the metadata repository and retrieving service parameters for a service;
   generating a parser tree based on the retrieved service parameters, wherein generating the parser tree starting with a root directory, followed by a service group, the service, one or more buffer definitions per the service and the service parameters; and
   recursively walking through the parser tree and generating target output files based on the parser tree, wherein the target output files comprise a composite file, a component file, an abstract base class header file, and a skeletal implementation class header file;
   wherein the target output files are configured so that the SCA server can access services that have associated service metadata stored in the metadata repository without requiring information regarding the architecture.

2. The non-transitory computer readable medium of claim 1, wherein the metadata repository comprises at least one of: a runtime, a stored repository file or an input repository file received with the input instructions.

3. The non-transitory computer readable medium of claim 1, wherein the target output files further comprise at least one Extensible Markup Language Schema Definition schema for complex data types.

4. The non-transitory computer readable medium of claim 1, wherein the metadata repository is a Tuxedo® Metadata Repository.

5. A Service Component Architecture (SCA) server, comprising:
   a memory configured to store one or more modules;
   a processor configured to execute the one or more modules;
   an instruction analyzing module configured to analyze input instructions and to determine the metadata repository from the input instructions, wherein the metadata repository comprises an architecture;
   a matching module configured to match a service identifier received with the input instructions to service metadata stored in the metadata repository;
   a retrieving module configured to retrieve service parameters for a service;
   a tree generating module configured to generate a parser tree based on the retrieved service parameters, wherein generating the parser tree starting with a root directory, followed by a service group, the service, one or more buffer definitions per the service and the service parameters; and
   an output file generation module configured to recursively walk through the parser tree and to generate target output files based on the parser tree, wherein the target output files comprise a composite file, a component file, an abstract base class header file, and a skeletal implementation class header file;
   wherein the target output files generated by the output generation module are configured so that the SCA server can access services that have associated service metadata stored in the metadata repository without requiring information regarding the architecture.

6. The SCA server of claim 5, wherein the target output files further comprise at least one Extensible Markup Language Schema Definition schema for complex data types.

7. The SCA server of claim 5, wherein the metadata repository comprises at least one of: a runtime, a stored repository file or an input repository file received with the input instructions.

8. The SCA server of claim 5, wherein the metadata repository is a Tuxedo® Metadata Repository.

9. A computer-implemented method for using data in a metadata repository to generate files that can be used by a Service Component Architecture (SCA) server, comprising:
   analyzing input instructions input by a user via a command line interface and determining the metadata repository from the input instructions, wherein the metadata repository comprises one or more of a runtime, a stored repository file or an input repository file received with the input instructions, and wherein the metadata repository comprises an architecture;
   matching a service identifier received with the input instructions to service metadata stored in the metadata repository and retrieving service parameters for a service, wherein the service identifier is a service name;
   generating a parser tree based on the retrieved service parameters starting with a root directory, followed by a service group, the service, one or more buffer definitions per the service and the service parameters; and
   recursively walking through the parser tree and generating target output files based on the parser tree, the target output files comprising a composite file, a component file, an abstract base class header file, and a skeletal implementation class header file;
   wherein the target output files are configured so that the SCA server can access services that have associated service metadata stored in the metadata repository without requiring information regarding the architecture.

10. The computer-implemented method of claim 9, wherein the target output files further include at least one Extensible Markup Language (XML) Schema Definition (XSD) schema for complex data types.

11. The computer-implemented method of claim 9, wherein the metadata repository is a Tuxedo® Metadata Repository.

* * * * *

UNITED STATES PATENT AND TRADEMARK OFFICE
CERTIFICATE OF CORRECTION

| | | |
|---|---|---|
| PATENT NO. | : 8,239,419 B2 | Page 1 of 1 |
| APPLICATION NO. | : 12/535300 | |
| DATED | : August 7, 2012 | |
| INVENTOR(S) | : Lo | |

It is certified that error appears in the above-identified patent and that said Letters Patent is hereby corrected as shown below:

In column 5, line 63, delete "and or" and insert -- and/or --, therefor.

Signed and Sealed this
Sixth Day of November, 2012

David J. Kappos
*Director of the United States Patent and Trademark Office*